United States Patent [19]

Nagano

[11] Patent Number: 4,670,779
[45] Date of Patent: Jun. 2, 1987

[54] COLOR-PICTURE ANALYZING APPARATUS WITH RED-PURPOSE AND GREEN-PURPOSE FILTERS

[75] Inventor: Fumikazu Nagano, Yamatokoriyama, Japan

[73] Assignee: Sharp Kabushiki Kaisha, Osaka, Japan

[21] Appl. No.: 688,936

[22] Filed: Jan. 4, 1985

[30] Foreign Application Priority Data

Jan. 10, 1984 [JP] Japan .................................... 59-3788

[51] Int. Cl.$^4$ ...................... H04N 1/00; G03B 27/54; G01J 3/46; G06K 9/46
[52] U.S. Cl. .................................... 358/75; 356/402; 355/37; 381/17
[58] Field of Search ...................... 358/75, 78, 80, 41; 382/17; 355/4, 35, 37, 38; 250/226, 578; 356/402, 404, 405, 406, 407, 425

[56] References Cited

U.S. PATENT DOCUMENTS

| 4,318,122 | 3/1982 | White ..................................... 358/75 |
| 4,371,258 | 2/1983 | Mast ..................................... 355/37 |
| 4,469,433 | 9/1984 | Kurata et al. ........................... 358/75 |

FOREIGN PATENT DOCUMENTS

| 55-30214 | 3/1980 | Japan ..................................... 358/75 |
| 55-97772 | 7/1980 | Japan ..................................... 358/75 |
| 55-131873 | 10/1980 | Japan ..................................... 358/75 |
| 57-17263 | 1/1982 | Japan ..................................... 358/75 |
| 57-150270 | 9/1982 | Japan ..................................... 358/75 |
| 2138244 | 10/1984 | United Kingdom .................. 358/75 |

Primary Examiner—Michael A. Masinick
Assistant Examiner—Robert Michael Bauer
Attorney, Agent, or Firm—Birch, Stewart, Kolasch & Birch

[57] ABSTRACT

A color-picture reading apparatus comprises blue, red-purpose, and green-purpose fluorescent lamps, a red filter in front of the red-purpose lamp for solely passing the red radiation, a green filter in front of the green-purpose lamp for solely passing the green radiation, and a circuit for subsequently switching on and off the three lamps. Both the red filter and the green filter comprise a first filter for filtering the short wavelength radiation and a second filter for cutting the long wavelength radiation. The first filter is a glass filter and the second filter is an interference filter. All of the three lamps have a short afterglow time.

5 Claims, 14 Drawing Figures

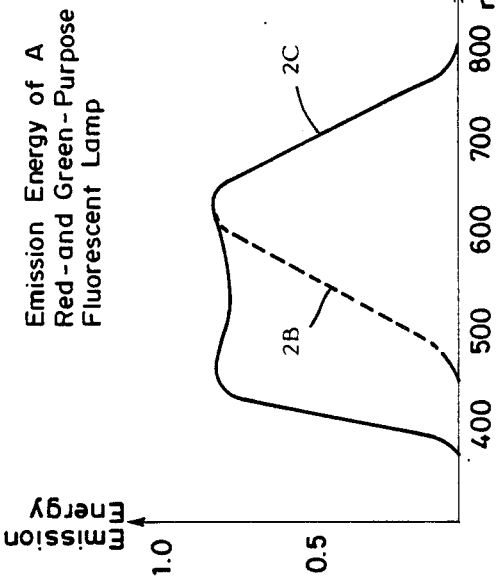
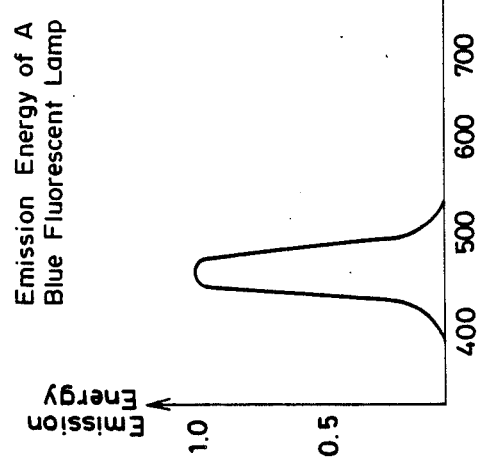
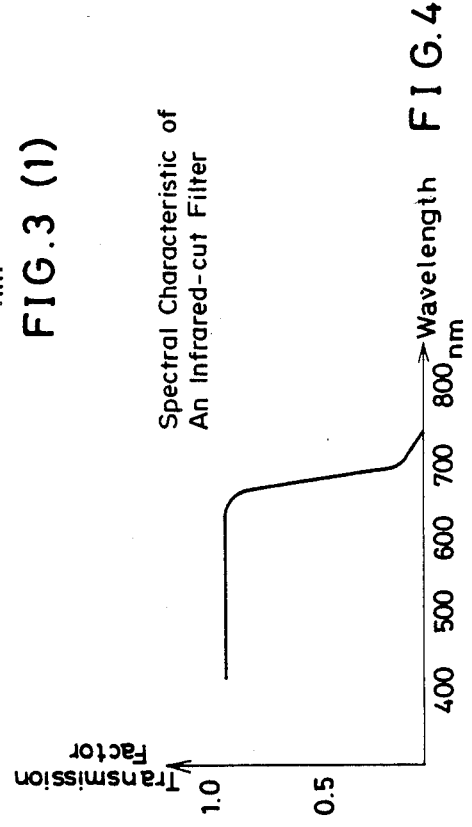

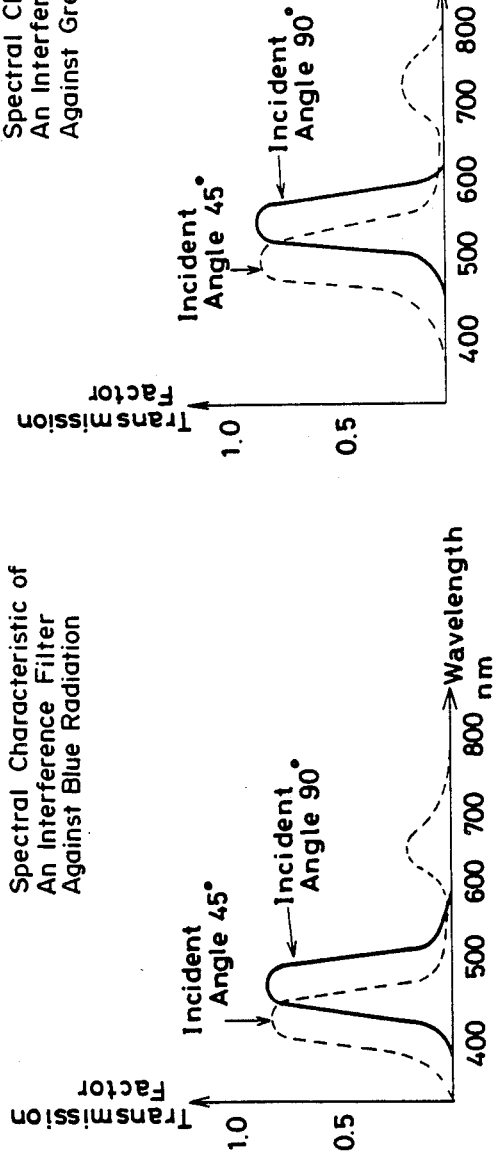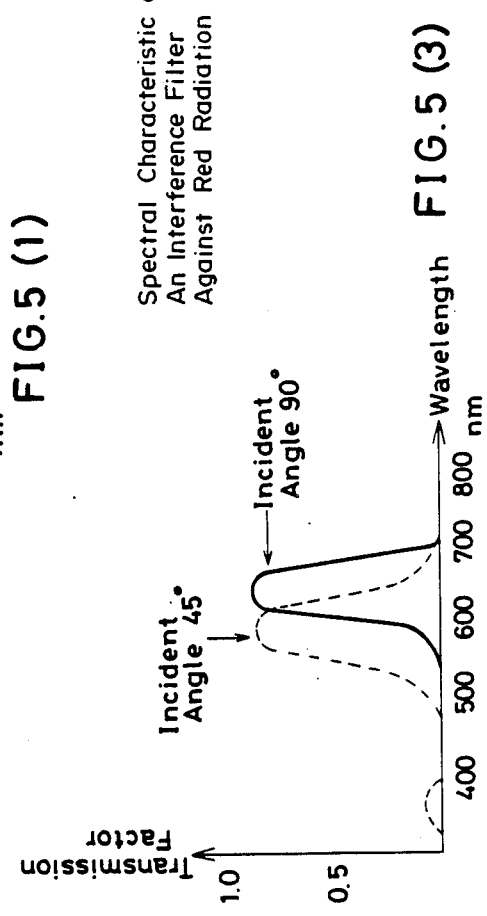

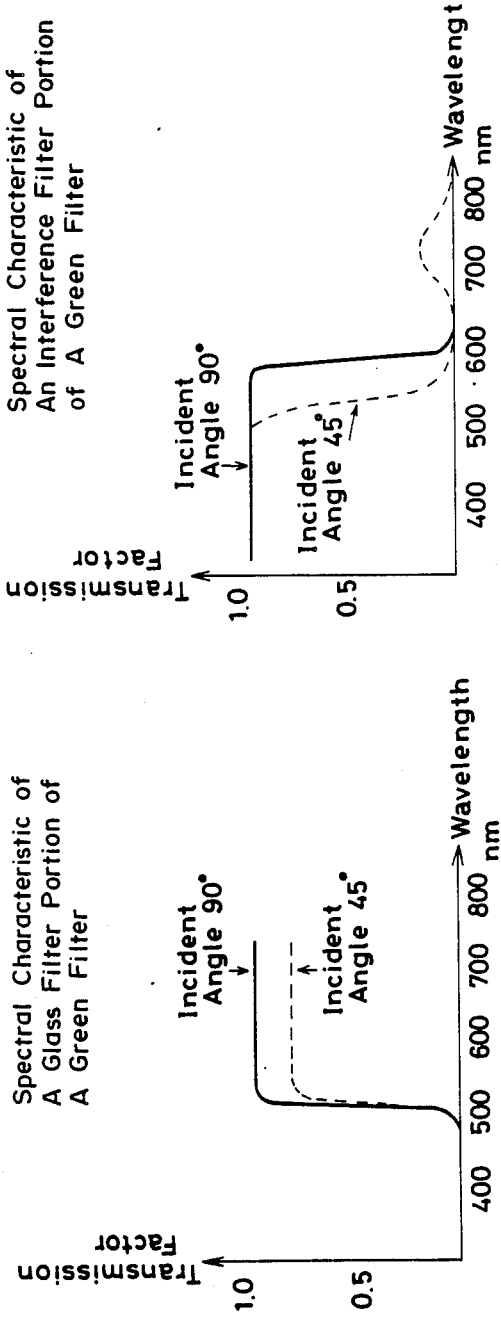
FIG.6(1) Spectral Characteristic of A Glass Filter Portion of A Green Filter
FIG.6(2) Spectral Characteristic of An Interference Filter Portion of A Green Filter
FIG.6(3) Spectral Characteristic of A Green Filter

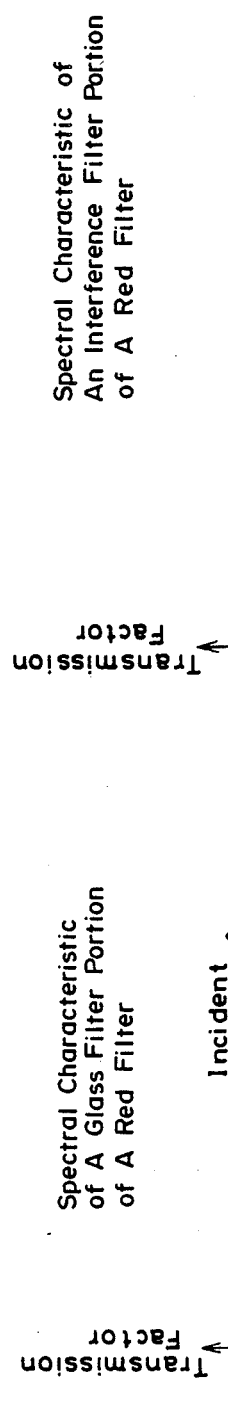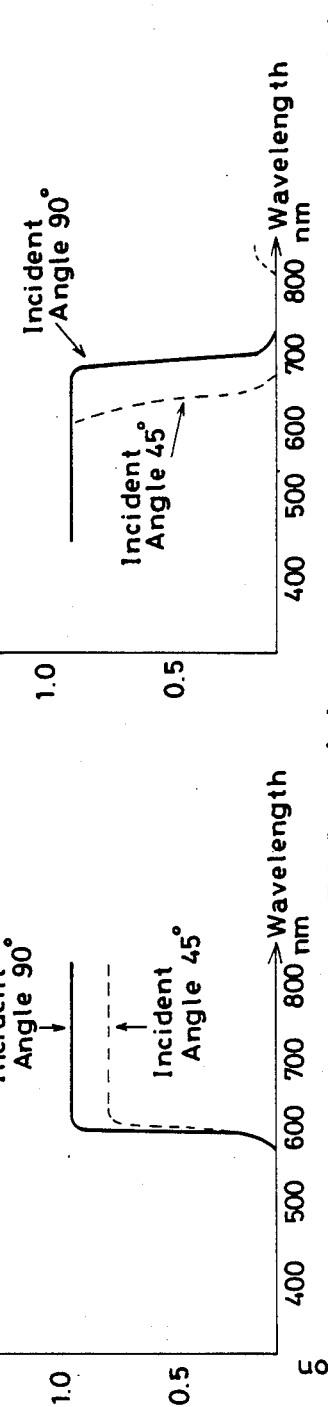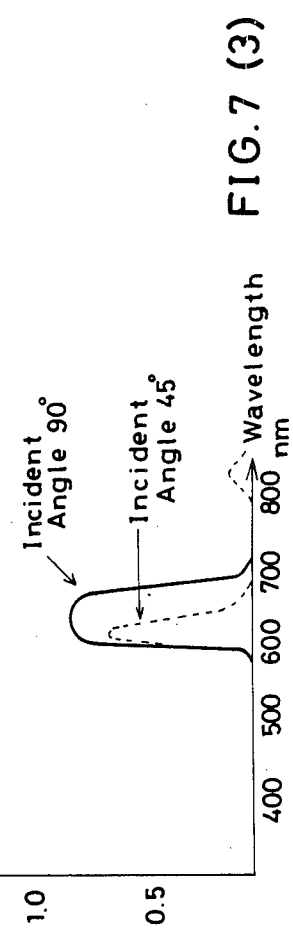

COLOR-PICTURE ANALYZING APPARATUS WITH RED-PURPOSE AND GREEN-PURPOSE FILTERS

BACKGROUND OF THE INVENTION

The present invention relates to a picture reading apparatus and, more particularly, to a color-picture analyzing apparatus suitable for a color facsimile machine, color copying machine, and color scanner.

Conventionally, a color-picture analyzing apparatus is provided in a color facsimile machine, color copying machine, and color scanner for analyzing the color-picture into the red component, green component, and blue component by optically scanning the color-picture, so that they are electrically converted and outputted. To analyze the red, green, and blue components from the color-picture, various types of filters are presented through which reflected radiations from the color-picture are passed to pick-up picture information for a specific wavelength zone.

Some conventional blue fluorescent lamps can respond quickly and have a short afterglow time while the conventional red and green fluorescent lamps inevitably have relatively long afterglow times (about 10 msec). It may, therefore, be difficult to provide a superior reading apparatus for rapidly analyzing the color-picture.

SUMMARY OF THE INVENTION

Accordingly, it is an object of the present invention to provide an improved color-picture analyzing apparatus for analyzing a color-picture rapidly.

It is another object of the present invention to provide an improved color-picture analyzing apparatus suitable for a color facsimile machine, color copying machine, and color scanner for analyzing a color-picture, featured in that each of the blue, red-purpose, and green-purpose fluorescent lamps have a short afterglow time.

It is a further object of the present invention to provide an improved color-picture reading apparatus for analyzing a color-picture by sequentially switching on blue, red-purpose, and green-purpose fluorescent lamps, the red-purpose and green-purpose fluorescent lamps being faced by filter means comprising a first filter for cutting the short wavelength radiation and a second filter for cutting the long wavelength radiation.

Briefly described, in accordance with the present invention, a color-picture analyzing apparatus suitable for a color facsimile machine, color copying machine, and color scanner comprises blue, red-purpose, green-purpose fluorescent lamps, red filter means positioned in front of the red-purpose fluorescent lamp for solely passing the red radiation, green filter means positioned in front of the green-purpose fluorescent lamp for solely passing the green radiation, and means for subsequently switching on and off the three fluorescent lamps. Both the red filter means and the green filter means comprise a first filter for cutting the short wavelength radiation and a second filter for cutting the long wavelength radiation. The first filter may be a glass filter and the second filter may be an interference filter. All of the three fluorescent lamps have a short afterglow time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 3(1) and 3(2) are a graph showing a distribution of emission energy of a blue fluorescent lamp and a red- and green-purpose fluorescent lamp, respectively, used for the present invention;

FIG. 4 is a graph showing the spectral characteristic of an infrared-cut filter used for the present invention;

FIGS. 5(1) through 5(3) are graphs showing the spectral characteristic of an interference filter against blue, green, and red, respectively;

FIG. 6(1) is a graph showing the spectral characteristic of a glass filter, FIG. 6(2) shows that of an interference filter, and FIG. 6(3) shows those of a green filter according to the present invention; and FIG. 7(1) is a graph showing the spectral characteristic of a glass filter, FIG. 7(2) shows that of an interference filter, and FIG. 7(3) shows those of a red filter according to the present invention.

DESCRIPTION OF THE INVENTION

Figure 1:
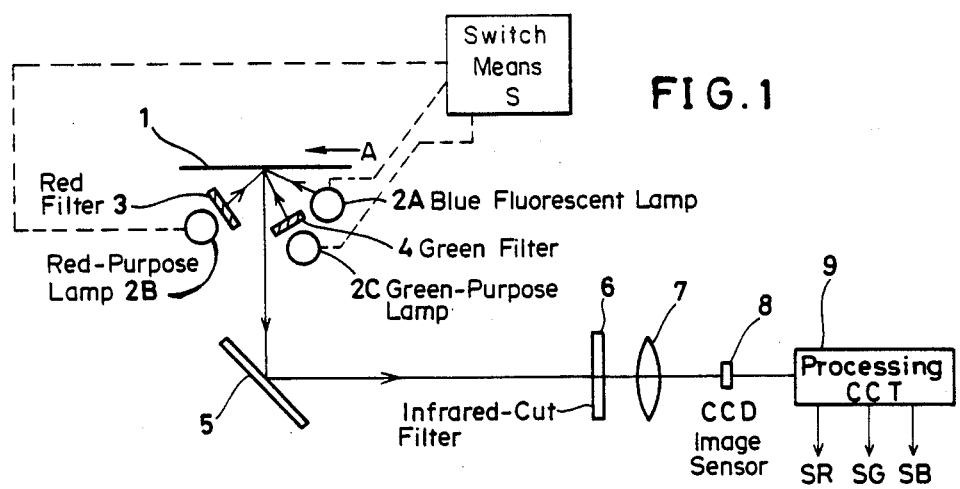
FIG. 1 is a side view of a color-picture reading apparatus according to the present invention.

FIG. 1 is a side view of a color-picture reading apparatus of the present invention. It is applicable to a color facsimile, color copying machine, and color scanner.

With reference to FIG. 1, a document 1 having thereon a color-picture to be readout is transported along the direction of the arrow A by transport means (not shown). To emit light toward the document 1, three light emitting sources 2A, 2B, and 2C are provided. A first source 2A is a blue fluorescent lamp for providing blue spectral radiations characterized in that the emission energy of FIG. 3(1) with a short afterglow time is provided. The term "afterglow time" is referred to as the interval when the lamp continuous to propagate some radiation after the power supply to itself has been shut off. During the afterglow time, the spectral characteristics of all the fluorescent lamps as used for the present invention are unchanged although their emission levels are relatively small.

For the present invention, both second and third fluorescent lamps 2B and 2C propagate the spectral emission energy as shown in FIG. 3(2). In FIG. 3(2), the data as plotted in the solid line relate to the green-purpose flurorescent lamp while the data in the broken line relates to the red-purpose lamp. These lamps can be called cool white fluorescent lamps, although they are not limited to the cool white type so long as each of them can cover the red or green spectral zone. They comprise fluorescent materials to cover the emission over the wide range with a short afterglow time.

The second lamp, 2B has an emission band sufficient to cover the red zone. For example, such a lamp may comprise a fluorescent material of trade name "SPD-103A", available from Toshiba Corporation, Japan. The "SPD-103A" can provide a short afterglow time of about 10 micro sec. The lamp 2C has an emission band sufficient to cover the green zone. For example, such a lamp may comprise mixed components of trade name "SPD-11N" by Toshiba Corporation and "SPD-103A". Since the "SPD-11N" can provide a short afterglow time of about 2 micro sec, the mixed material can provide an afterglow time in the same order. Thus, the afterglow time of each lamp is sufficiently short.

Figure 2:
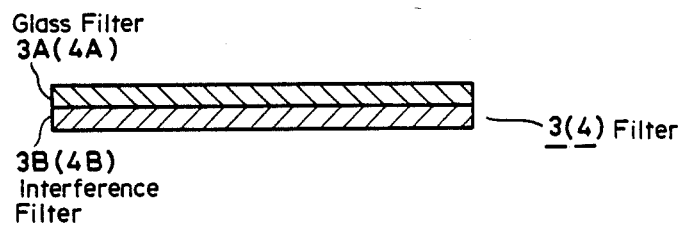
FIG. 2 is a sectional view of a filter for red and green according to the present invention.

In front of the lamps 2B and 2C, a red filter 3 and a green filter 4 are positioned. The red filter 3 is composed of a glass filter portion 3A for cutting short wavelength waves and an interference filter portion 3B for cutting long wavelength waves. The green filter 4 consists of a glass filter portion 4A and an interference filter portion 4B, too. The construction of each filter 3 or 4 is indicated in FIG. 2. Preferably, the glass filter portions 3A(4A) and the interference filter portions 3B(4B) are integrally overlayed. It may be possible that they are separated from each other.

First, light is emitted from the lamps 2A, 2B, and 2C, and is reflected by the document 1, so that the reflected light is further reflected by a reflection mirror 5 and is incident upon a reading lens 7 via an infrared-cut filter 6. The light passing through the lens 7 is incident upon a charge coupled device (CCD) image sensor 8. The image sensor 8 can provide signals corresponding to the reflected light into a processing circuit 9. The processing circuit 9 outputs red components SB, green components SB, and blue components SB.

FIG. 4 shows the spectral characteristics of the infrared-cut filter 6 which is only exemplary although not limited to such an example.

Regarding the red filter 3 and the green filter 4, they may be replaced by a filter comprising a single material, solely, selected from a gelatin filter, a glass filter, and an interference filter. However, such a single filter has inferior characteristics. The gelatin filter cannot provide a good transmission factor and is weak to heat. The glass filter cannot provide a good transmission factor. Although the interference filter can provide a good transmission factor, its spectral characteristic can change greatly depending on a change in the incident angle of light incident upon itself.

FIGS. 5(1), 5(2), and 5(3) show graphs representing the spectral characteristic of the interference filter with blue, green, and red radiation, respectively. These graphs indicate that when the incident angle is oblique, for example, 45 degrees, the spectral transmission zone can be shifted toward the short wavelength zone while a small transmission zone starts to appear at the long wavelength zone.

According to the present invention, to eliminate the above problem, each of the red filter 3 and the green filter 4 is provided. They may comprise an overlay structure of a glass filter and an interference filter.

FIG. 6(1) is a graph representing the spectral characteristic of the glass filter 4A of the green filter 4 for cutting the short wavelength. As shown, even when the incident angle of the light becomes oblique, the spectral transmission zone cannot be shifted although the spectral characteristics become small compared with the case of an incident angle of 90 degrees.

FIG. 6(2) shows a graph indicative of the spectral characteristic of the interference filter 4B for cutting the long wavelength waves to serve as the green filter 4. As shown, when the incident angle of the light becomes oblique, the spectral transmission zone may be shifted toward the short wavelength zone. However, these effects can be cut out by the characteristic of the glass filter 4A. The spectral transmission zone at the long wavelength can be cut out by infrared-cut filter 6.

Thus, the green filter 4 can provide the spectral characteristic as shown in FIG. 6(3), which is a correlation of the glass filter 4A having the characteristic of FIG. 6(1) and the interference filter 4B having the characteristic of FIG. 6(3). The green filter 4 is characterized in that the spectral characteristic can be changed relatively over its transmission factor even when the light is obliquely incident. In combination with the lamp 2C having a short afterglow time, the green filter 4 provides good green spectral radiations.

FIG. 7(1) shows a graph of the spectral characteristic of the glass filter 3A for the red filter 3. FIG. 7(2) shows a graph of the spectral characteristic of the interference filter 3B of the filter 3. FIG. 7(3) shows a graph of the spectral characteristic of the red filter 3 as composed with those of the glass filter 3A and the interference filter 3B. As shown, because the red filter 3 is featured in that the spectral transmission band cannot be shifted depending upon the changes in the incident angles of the light, the red filter 3 and the lamp 2B, having a short afterglow time, can provide the good red spectral emission.

In operation, first, the lamp 2A is switched on by switch means S so that the reflected light can be incident upon the CCD image sensor 8, the reflected light corresponding to the spectral emission characteristic of the lamp 2A. The CCD sensor 8 provides the signals corresponding to the reflected light into the processing circuit 9. After the processing, the processing circuit 9 outputs the blue components SB. Second, while the lamp 2A is switched off by means S, the lamp 2B is to be switched on by means S so that the processing circuit 9 provides the red components SR. Last, while the lamp 2B is switched off, the lamp 2C is to be switched on by means S. The circuit 9 provides the green components SG. Thereafter, the document 1 is transported along the arrow direction A in a predetermined distance. The above operations are repeated to subsequently analyze the color-pictures.

In addition to the blue fluorescent lamp having a short afterglow time, according to the present invention, because good light emitting sources for red and green can be provided by the filters 3 and 4 in combination with the short afterglow time fluorescent lamps, the switching on and off of the lamps can be accelerated to make it possible to rapidly analyze the blue, green, and red components.

In the embodiment of FIG. 1, the infrared-cut filter 6 is provided. To eliminate the filter 6, alternatively, the reflected mirror should serve to cut the infrared radiation by comprising a filter named "cold filter".

While only certain embodiments of the present invention have been described, it will be apparent to those skilled in the art that various changes and modifications may be made therein without departing from the sprit and scope of the present invention as claimed.

What is claimed is:

1. A color picture analyzing apparatus comprising:
   first lamp means for propagating blue spectral radiation toward said color picture;
   second lamp means for directing spectral radiation inclusive of red radiation toward said color picture;
   third lamp means for directing spectral radiation inclusive of green radiation toward said color picture;

red filter means for solely passing the red radiation, said red filter means being positioned between the second lamp means and the color picture, said red filter means comprising a first glass filter for cutting the short wavelength radiation and a first interference filter for cutting the long wavelength radiation;

green filter means for solely passing the green radiation, said green filter means being positioned between the third lamp means and the color picture, said green filter means comprising a second glass filter for cutting the short wavelength radiation and a second interference filter for cutting the long wavelength radiation; and means for subsequently switching on and off said three lamp means.

2. The apparatus of claim 1, wherein each of said first, second and third lamp means has a short afterglow time.

3. The apparatus of claim 2, wherein one of said second and third lamp means is a fluorescent lamp.

4. The apparatus of claim 3, wherein the fluorescent lamp is a cool white type.

5. The apparatus of claim 1, wherein said red filter means and said green filter means prevent the spectral transmission zones of the radiation from both said second lamp means and said third lamp means from being shifted even when the radiation is obliquely incident upon said red and green filter means respectively.

* * * * *